(12) United States Patent
Ko et al.

(10) Patent No.: US 7,679,208 B1
(45) Date of Patent: Mar. 16, 2010

(54) APPARATUS AND SYSTEM FOR PITCH ANGLE CONTROL OF WIND TURBINE

(75) Inventors: Hee-Sang Ko, Geoje-si (KR); Yun-Tae Kang, Geoje-si (KR)

(73) Assignee: Samsung Heavy Ind. Co., Ltd. (KR)

( * ) Notice: Subject to any disclaimer, the term of this patent is extended or adjusted under 35 U.S.C. 154(b) by 0 days.

(21) Appl. No.: 12/424,410

(22) Filed: Apr. 15, 2009

Related U.S. Application Data

(63) Continuation of application No. PCT/KR2009/001724, filed on Apr. 3, 2009.

(30) Foreign Application Priority Data

| Sep. 18, 2008 | (KR) | ...................... 10-2008-0091755 |
| Sep. 18, 2008 | (KR) | ...................... 10-2008-0091771 |
| Jan. 23, 2009 | (KR) | ...................... 10-2009-0006320 |

(51) Int. Cl.
  *H02P 9/00* (2006.01)
  *F03D 9/00* (2006.01)

(52) U.S. Cl. .............................. 290/44; 290/55; 322/37

(58) Field of Classification Search ...................... 290/7, 290/44, 55; 322/25, 37
See application file for complete search history.

(56) References Cited

U.S. PATENT DOCUMENTS

| 4,703,189 | A | * | 10/1987 | DiValentin et al. ............ 290/44 |
| 5,083,039 | A | * | 1/1992 | Richardson et al. ............ 290/44 |
| 6,856,040 | B2 | * | 2/2005 | Feddersen et al. ............. 290/44 |
| 6,933,625 | B2 | * | 8/2005 | Feddersen et al. ............. 290/44 |
| 7,015,595 | B2 | * | 3/2006 | Feddersen et al. ............. 290/44 |
| 7,355,294 | B2 | * | 4/2008 | Teichmann .................. 290/44 |
| 7,462,947 | B2 | * | 12/2008 | Wobben ...................... 290/44 |
| 7,569,944 | B2 | * | 8/2009 | Oohara et al. ................. 290/44 |
| 2009/0206606 | A1 | * | 8/2009 | Jorgensen et al. ............. 290/44 |

* cited by examiner

*Primary Examiner*—Nicholas Ponomarenko
(74) *Attorney, Agent, or Firm*—Brinks Hofer Gilson & Lione

(57) ABSTRACT

A pitch control apparatus for controlling the pitch value for a wind power generation system includes a generator comparing unit that calculates an error signal based on a difference between a generator measurement signal corresponding with an operation of the power generation system and a generator reference signal, and a reference pitch calculating unit that calculates a reference pitch value using the error signal. The pitch control apparatus further includes a compensation pitch calculating unit that calculates a compensation pitch value using an error value from the wind power generation system and a pitch calculating unit that calculates a pitch value using the reference pitch value and the compensation pitch value. The error value may be any one of a voltage error value from a direct-current capacitor, a voltage error value from a grid connection point, a speed error value from a rotor, and a frequency error value from a grid connection point.

22 Claims, 14 Drawing Sheets

APPARATUS AND SYSTEM FOR PITCH ANGLE CONTROL OF WIND TURBINE

PRIORITY CLAIM

This application is a continuation and claims the benefit of priority under 35 U.S.C. §§120, 365, and 371 to Patent Cooperation Treaty Patent Application No. PCT/KR2009/001724, filed on Apr. 3, 2009. This application further claims the benefit of priority to Korean Applications Nos. 10-2008-0091755, filed Sep. 18, 2008, 10-2008-0091771, filed Sep. 18, 2008 and 10-2009-0006320, filed Jan. 23, 2009. The disclosures of the above applications are incorporated herein by reference.

TECHNICAL FIELD

The present invention relates to an apparatus and a system for controlling pitch angle in a wind turbine, more particularly to an apparatus and a system for controlling pitch angle in a wind turbine by generating compensation pitch values in the event of low voltage in the power grid.

RELATED ART

Because wind is a pollution-free, unlimited resource that can be collected from virtually anywhere on earth, wind power generation makes it possible to efficiently use the land with very little impact on the environment.

Wind power generation is also a new power generation technology that can offer a competitive unit cost of power generation when utilizing large scale wind farms.

With the recent increase in energy costs, the market is fast expanding for distributed generation, such as wind power generation, in which power sources are installed in dispersed consumer locations. In the distributed generation, controlling each distributed power source is very important for efficiently managing the power generation system.

The voltage control method applied to conventional wind power generation systems may be based on power factor control (Qref) that uses a reactive power compensation apparatus (a capacitor bank).

A wind power generation system may be connected to an existing power grid to supply electrical power, in which case it is very important to provide high stability and efficiency in the power grid connection.

However, in a conventional wind power generation system, generators connected to a power grid, especially those for distributed generation, may be cut off simultaneously in the event of a power failure. This can incur voltage and frequency changes in the grid, causing severe problems in the stability of the power grid.

Also, when using a conventional wind power generation system, a large capacity of wind power can cause undesired effects in stabilizing the grid, making it difficult to warrant the conditions for connecting to power grids for power generation systems that utilize distributed power sources.

SUMMARY

As an example only, in one embodiment, a pitch control apparatus for controlling a pitch value in a wind power generation system is provided. The pitch control apparatus includes a generator comparing unit, a reference pitch calculating unit, a compensation pitch calculating unit and a pitch calculating unit. The generator comparing unit is configured to calculate an error signal based on a difference between a generator measurement signal and a generator reference signal, the generator measurement signal corresponding with an operation of the power generation system. The reference pitch calculating unit is configured to calculate a reference pitch value using the error signal. The compensation pitch calculating unit is configured to calculate a compensation pitch value using an error value from the wind power generation system. The pitch calculating unit is configured to calculate a pitch value using the reference pitch value and the compensation pitch value. The error value is any one of a voltage error value from a direct-current capacitor included in a power converter unit of the wind power generation system, a voltage error value from a grid connection point of the wind power generation system, a speed error value from a rotor of the wind power generation system, and a frequency error value from a grid connection point of the wind power generation system.

In another embodiment, a pitch control system for controlling pitch values in a plurality of wind power generation systems is provided. The pitch control system includes a plurality of pitch control apparatuses and a compensation pitch calculating apparatus configured to calculate an apportion-compensation pitch value by using a voltage error value or a frequency error value calculated at a grid connection point where the plurality of wind power generation systems are connected. The pitch control apparatus further includes a generator comparing unit configured to calculate an error signal based on a difference between a generator measurement signal and a generator reference signal, the generator measurement signal corresponding with an operation of the power generation system, a reference pitch calculating unit configured to calculate a reference pitch value by using the error signal and a pitch calculating unit configured to calculate a pitch value by using the reference pitch value and the apportion-compensation pitch value calculated by the compensation pitch calculating apparatus.

DETAILED DESCRIPTION OF THE PREFERRED EMBODIMENTS

In one embodiment, a pitch control system may improve the ability of a wind turbine to overcome low voltage situations in the grid, by sensing overvoltage induced over the rated voltage in the direct-current capacitor of the power converter unit connected to a generator and controlling the pitch value of the wind turbine accordingly. In another embodiment, the pitch control system may continuously maintain the voltage or frequency within a given reference range at the grid connection point, by sensing voltages or frequencies induced over the rated voltage or rated frequency, when the voltage or frequency is modified at the grid connection point, and controlling the pitch value of the wind turbine accordingly. In yet another embodiment, the pitch control system may prevent increases in the speed of the generator rotor in the event of a low voltage situation in the grid connection point, by sensing and controlling the modified speeds of the generator rotor. In yet another embodiment, the pitch control system may prevent continuously maintain the voltage or frequency within a given reference range at the grid connection point of multiple wind turbine, by sensing voltages or frequencies induced over the rated voltage or rated frequency, when the voltage or frequency is modified at the grid connection point, and controlling the pitch values of the wind turbine accordingly. In yet another embodiment, the pitch control system may provide a stable power quality and reliable grid management without extra facilities or processes, by adding a compensation pitch calculating apparatus to the pitch control apparatuses of multiple wind turbines.

Figure 1:
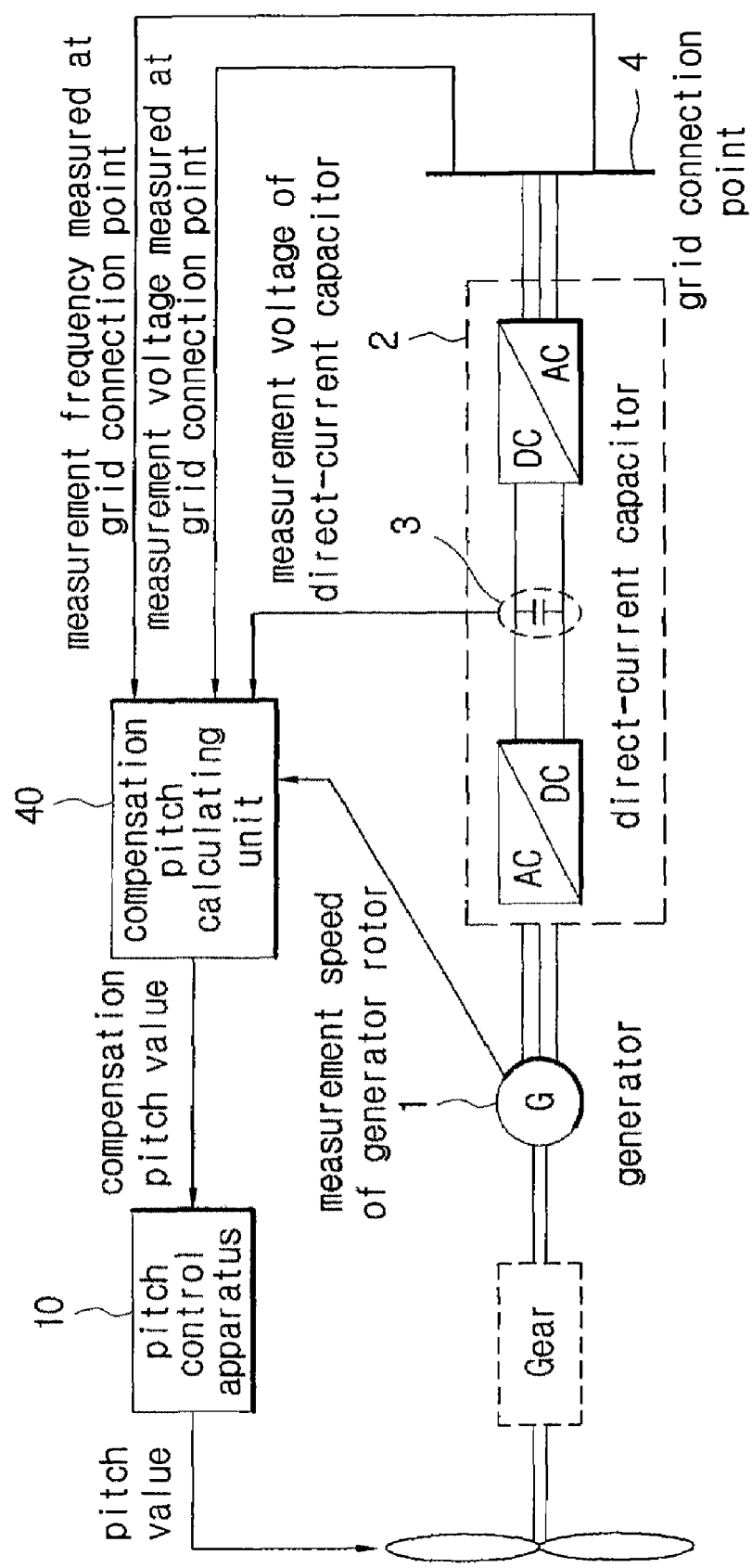
FIG. 1 is a diagram representing an exemplary relationship between a pitch control apparatus 10, a compensation pitch calculating unit 40, and a wind power generation system.

Referring to the accompanying drawings, the embodiments will be described in more detail. FIG. 1 is a drawing representing the relationship between a pitch control apparatus 10, a compensation pitch calculating unit 40, and a wind power generation system according to an aspect of the present invention.

The wind power generation system may generally include a pitch control apparatus 10, which can control a pitch value. The pitch control apparatus 10 may detect changes in the driving speed, output, etc., of the wind turbine and control the pitch value in accordance with the degree of change.

The compensation pitch calculating unit 40 according to an aspect of the present invention may generate a compensation pitch value according to an error value of the wind turbine and transfer the compensation pitch value to the pitch control apparatus 10, so as to control the pitch value of the wind turbine. Here, the error value may be the difference between a reference value and a measured value, and may be generated according to changes in the voltage or frequency at the grid connection point, the rotor speed of a generator 1, the voltage of a direct-current capacitor 3, etc.

Referring to FIG. 1, the wind power generation system can include a generator 1, a power converter unit 2 connected to the generator 1 that converts the electrical power produced by the generator 1, and a grid connection point 4. Here, the power converter unit 2 may include the direct-current capacitor 3.

The compensation pitch calculating unit 40 according to an embodiment of the present invention may measure the frequency at the grid connection point 4 of the wind power generation system, calculate the compensation pitch value in accordance with the change in measured frequency, and transfer the compensation pitch value to the pitch control apparatus 10, to control the pitch value of the wind power generation system. In the event of low voltage in the grid, the frequency at the grid connection point 4 can be induced above the rated frequency.

Also, a compensation pitch calculating unit 40 according to another embodiment of the present invention may measure the voltage at the direct-current capacitor 3 of the wind power generation system, calculate the compensation pitch value in accordance with the change in measured voltage, and transfer the compensation pitch value to the pitch control apparatus 10, to control the pitch value of the wind power generation system. In the event of low voltage in the grid, the direct-current capacitor 3 can be supplied with excess current, so that overvoltage may occur.

A compensation pitch calculating unit 40 according to another embodiment of the present invention may measure the voltage at the grid connection point 4 of the wind power generation system, and calculate the compensation pitch value in accordance with the change in measured voltage, to control the pitch value of the wind power generation system. In the event of low voltage in the grid, the voltage at the grid connection point 4 can be induced above the rated voltage.

A compensation pitch calculating unit 40 according to another embodiment of the present invention may measure the rotor speed of the wind power generation system, and calculate the compensation pitch value in accordance with the change in measured speed, to control the pitch value of the wind turbine. In the event of low voltage in the grid, the speed of the rotor of the wind turbine can be increased.

Thus, the compensation pitch calculating unit 40 according to an aspect of the present invention can generate a compensation pitch value using an error value from the wind power generation system caused by low voltage in the grid.

Figure 2:
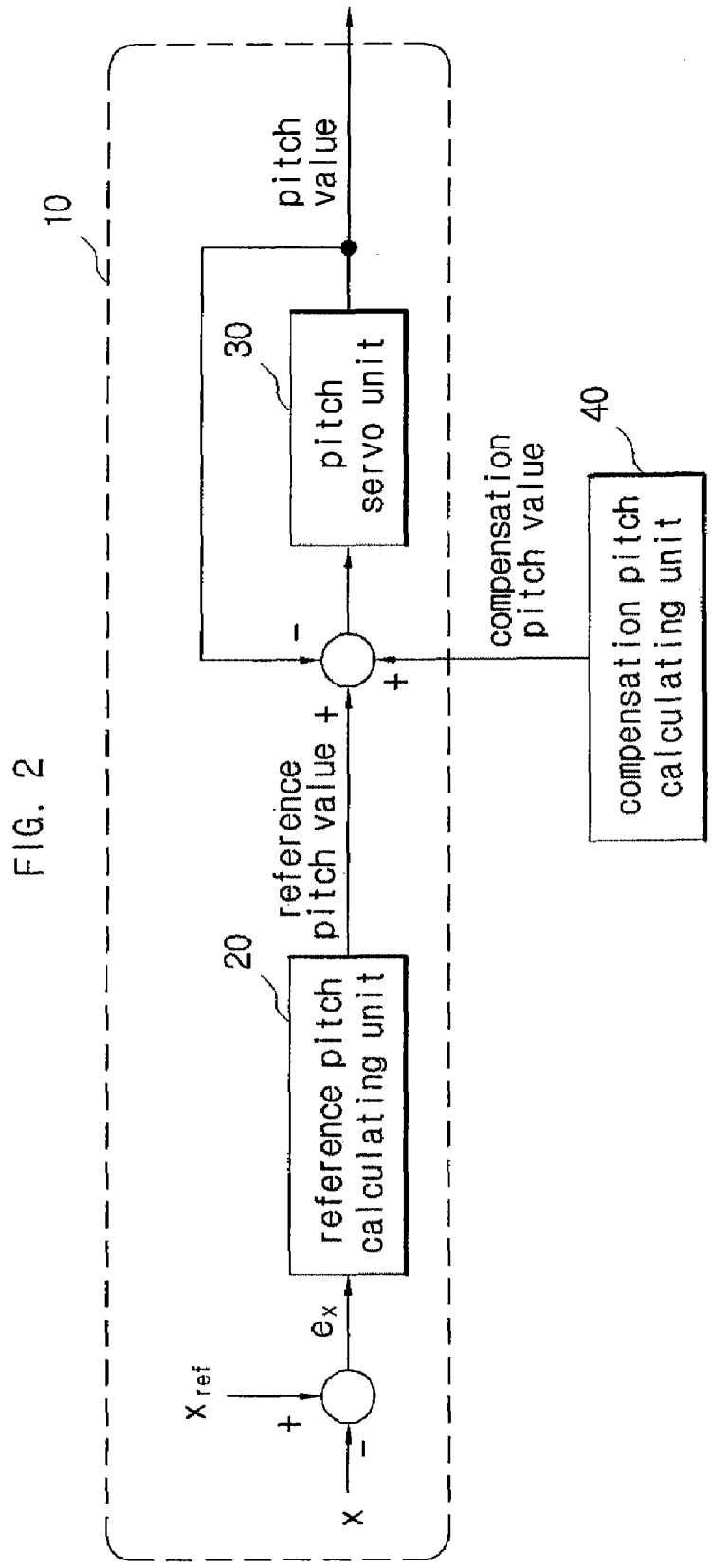
FIG. 2 is a diagram illustrating a pitch control apparatus 10 according to one embodiment.

FIG. 2 is a diagram illustrating a pitch control apparatus 10 according to an embodiment of the present invention. More specifically, FIG. 2 illustrates a pitch control apparatus 10 that includes a compensation pitch calculating unit 40 according to an embodiment of the present invention. Here, the compensation pitch calculating unit 40 according to an embodiment of the invention can be included inside the pitch control apparatus 10 or can be implemented as an external apparatus connected to the pitch control apparatus 10.

The pitch control apparatus 10 according to an aspect of the present invention may be an apparatus for controlling the pitch value to obtain the maximum output from wind energy. The power generation system that includes the pitch control apparatus 10 according to an aspect of the present invention may advantageously be applied to a wind power generation system, but it will be apparent to those skilled in the art that it may be applied to any type of power generation system that requires pitch control.

Referring to FIG. 2, the pitch control apparatus 10 can include a reference pitch calculating unit 20 and a pitch servo unit 30, which may be connected to the reference pitch calculating unit 20 and may operate in relation to a reference pitch value generated by the reference pitch calculating unit 20.

The pitch control apparatus 10 can also further include the compensation pitch calculating unit 40 described above with reference to FIG. 1.

The following will describe aspects of the present invention under the assumption that the pitch control apparatus 10 includes the compensation pitch calculating unit 40.

The pitch control apparatus 10 will be described below in more detail, with reference to FIG. 2.

A reference pitch calculating unit input ($e_x = X_{ref} - X$) can be an error signal inputted to the reference pitch calculating unit

20. Here, the error signal can be a difference in generator driving speed, a difference in generator output, etc., and can be predefined by the user. That is, X can be a measurement signal corresponding with the operation of the generator, while $X_{ref}$ can be a specified reference signal.

It will be apparent to those skilled in the art that the generator driving speed may refer to the rotation speed of the generator's driving shaft and may be proportional to the output of the generator.

For example, if the pitch controller input is assumed to be a difference in generator driving speed, X may be a measured value of the generator driving speed, and $X_{ref}$ may be a reference value for generator speed predefined by the user. Thus, the error signal (ex) for generator speed may be calculated using the generator speed measured value (X) and the generator speed reference value ($X_{ref}$).

Next, the reference pitch calculating unit 20 may calculate a reference pitch value corresponding to the inputted error signal (ex=$X_{ref}$−X). Here, the reference pitch calculating unit 20 can be a linear controller, which can include a proportional controller, a proportional-derivative controller, a proportional-integral controller, or a proportional-integral-derivative controller.

For example, if the reference pitch calculating unit 20 is a proportional-integral controller, the reference pitch value can be calculated by Equation 1 as follows:

$$F = \text{(proportional term)} + \int_0^t \text{(integral term)} dt \quad \text{[Equation 1]}$$

Here, F is assumed to be a proportional-integral controller. t represents time in units of seconds. If the proportional term is 1, the integral term is 5, and the units are in degree/rpm, and the speed error, i.e. the input value, is 5 rpm, then the reference pitch value, i.e. the output value, at the time of 0.2 seconds becomes 5 degrees. That is, the equation may be computed as follows:

$$5 \text{ degree} = \left(1 + \int_0^{0.2} 5 dt\right) \times 5 \text{ rpm}$$

When an error signal is received as input, the reference pitch calculating unit 20 may calculate a value for compensating the error signal, as a value corresponding with the error signal, the calculated value being the reference pitch value.

Here, the reference pitch value may be the pitch value calculated by the reference pitch calculating unit 20 to compensate for the difference between the predefined reference value ($X_{ref}$) and the measured value (X), and may be used as the input value for the pitch servo unit 30.

Next, the pitch servo unit 30 may receive the reference pitch value as input from the reference pitch calculating unit 20, and receive the compensation pitch value as input from the compensation pitch calculating unit 40, to calculate the pitch value. The pitch value may be inputted to the pitch servo unit 30 as feedback.

For example, the pitch servo unit 30 may calculate the pitch value by Equation 2 as follows:

$$F = \int_0^t \text{(system constant)} dt \quad \text{[Equation 2]}$$

Here, F is assumed to be a first order system as the pitch servo. t represents time (in units of seconds), while the reference pitch value, compensation pitch value, and the feedback pitch value are represented as angles (in degrees). If the input values include a reference pitch angle of 2.2 degrees, a compensation pitch value of 3 degrees, and a feedback pitch value of 4 degrees, and if the system constant is 5, and the units are in 1/sec, then the pitch value, i.e. the output value, at the time of 0.2 seconds becomes 0.92 degrees. That is, the equation may be computed as follows:

$$0.92 \text{ degree} = \left(\int_0^{0.2} 5 dt\right) \times (2.2 \text{ degree} + 3 \text{ degree} + 4 \text{ degree})$$

Figure 3:
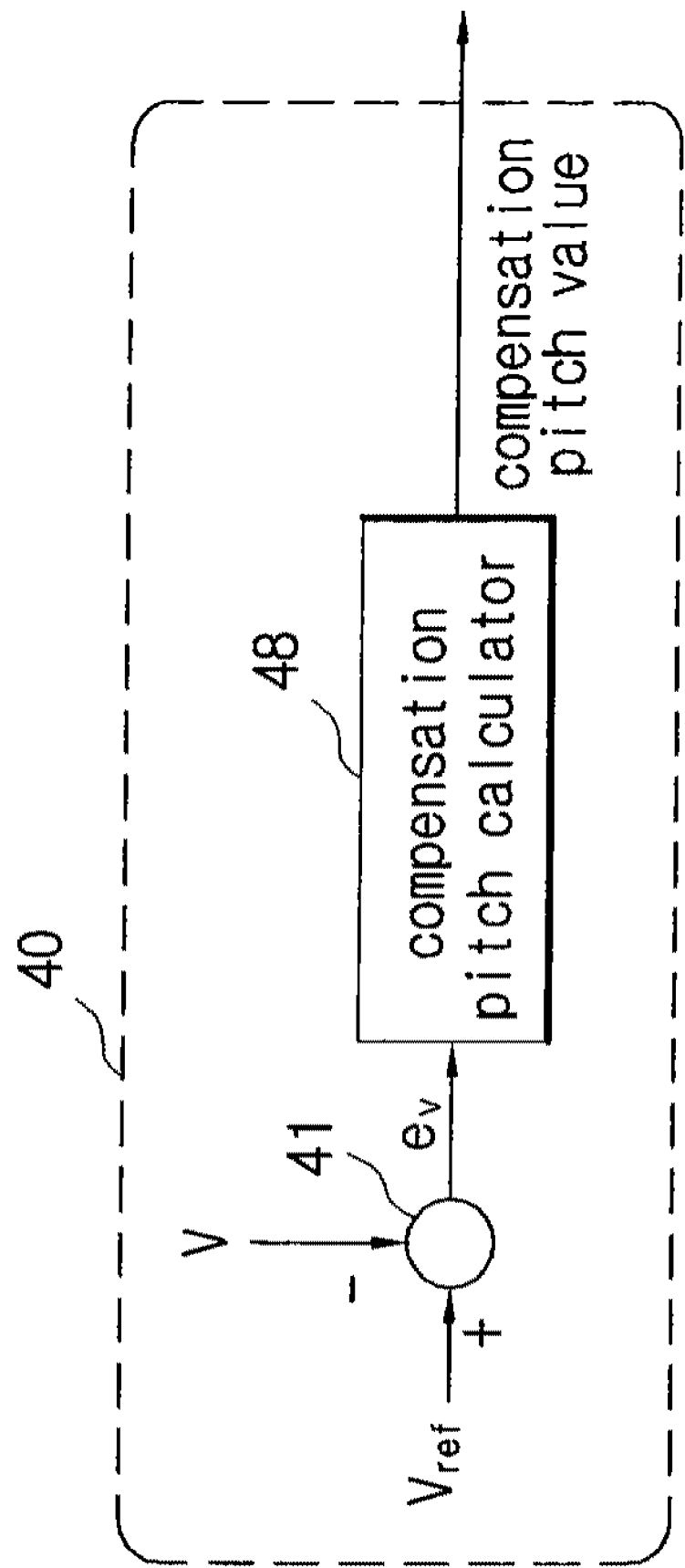
FIG. 3 is a diagram illustrating a compensation pitch calculating unit 40 according to another embodiment.

FIG. 3 is a diagram illustrating a compensation pitch calculating unit 40 according to an embodiment of the present invention.

Referring to FIG. 3, the compensation pitch calculating unit 40 may include a voltage comparing unit 41, which may compare the measurement voltage measured at the direct-current capacitor 3 with a predefined reference voltage for the direct-current capacitor 3 to calculate a voltage error, and a compensation pitch calculator 48, which may calculate a compensation pitch value.

First, the voltage comparing unit 41 may compare the measurement voltage (V), measured at the direct-current capacitor 3, with the reference voltage ($V_{ref}$) of the direct-current capacitor 3 to calculate the voltage error ($e_V$), which is the voltage difference.

Here, the reference voltage ($V_{ref}$) may be a voltage that allows a stable management of the grid and a stable supply of electric power, and may be predefined by the administrator in correspondence with the measurement voltage (V).

Next, the compensation pitch calculator 48 may calculate the compensation pitch value corresponding to the voltage error ($e_V$) inputted from the voltage comparing unit 41. That is, the compensation pitch calculator 48 may use an integrator to calculate the compensation pitch value that renders the final voltage error a value of zero.

For example, the compensation pitch calculator 48 may calculate the compensation pitch value by Equation 3 as follows:

$$F = \text{(proportional term)} + \int_0^t \text{(integral term)} dt \quad \text{[Equation 3]}$$

Here, F is assumed to be a proportional-integral controller. t represents time in units of seconds. If the proportional term is 1, the integral term is 5, the units are in degree/rpm, and the voltage error, i.e. the input value, is 5 V, then the compensation pitch value, i.e. the output value, at the time of 0.2 seconds becomes 5 degrees. That is, the equation may be computed as follows:

$$5 \text{ degree} = \left(1 + \int_0^{0.2} 5 dt\right) \times 5 \text{ V}$$

That is, the compensation pitch calculator 48 may receive a voltage error as input and provide a compensation pitch value as output. Here, the compensation pitch value may be used as an input value for the pitch servo unit 30 of the pitch control apparatus 10. Also, the compensation pitch calculator 48 can include any one of, or a combination of, a proportional controller, a proportional-derivative controller, a proportional-integral controller, and a proportional-integral-derivative controller, and can perform linear control.

A compensation pitch calculating unit 40 according to another embodiment of the present invention can further include a compensation real power calculator 46, which may calculate a compensation real power value. That is, the compensation pitch calculating unit 40 according to another embodiment of the present invention can include a voltage comparing unit 41, which may compare the measurement voltage measured at the grid connection point with a predefined grid connection point reference voltage to calculate voltage error, a compensation real power calculator 46, which may calculate a compensation real power value, and a compensation pitch calculator 48, which may calculate a compensation pitch value.

Using the voltage error inputted from the voltage comparing unit 41, the compensation real power calculator 46 may calculate the real power value that compensates for the voltage error. The calculated real power value may be transferred to the compensation pitch calculator 48.

For example, the compensation real power calculator 46 may calculate the compensation real power value by Equation 4 as follows:

$$F = \text{(proportional term)} + \int_0^t \text{(integral term)}\, dt \quad \text{[Equation 4]}$$

Here, F is assumed to be a proportional-integral controller. t represents time in units of seconds. If the proportional term is 1, the integral term is 5, the units are in Watt/V, and the voltage error, i.e. the input value, is 0.5 V, then the compensation real power value, i.e. the output value, becomes 0.55 Watts. That is, the equation may be computed as follows:

$$0.55 \text{ Watt} = \left(1 + \int_0^{0.2} 5\, dt\right) \times 0.5 \text{ V}$$

Also, the compensation pitch calculator 48 may calculate the compensation pitch value by the above Equation 4.

That is, if the compensation real power, i.e. the input value for the compensation pitch calculator 48, is 0.55 Watts, then compensation pitch value, i.e. the output value, becomes 1.1 degrees. Here, the proportional term for the controller is 1, and the integral term is 5, while the units are in degree/Watt. That is, the equation may be computed as follows:

$$1.1 \text{ degree} = \left(1 + \int_0^{0.2} 5\, dt\right) \times 0.55 \text{ Watt}$$

Here, a reason for calculating the real power value is that voltage and real power are closely correlated, so that voltage may change in accordance with a change in real power.

That is, the compensation real power calculator 46 may calculate a compensation real power value, which is in correspondence with voltage error and can be used to compensate for the voltage error.

The compensation real power calculator 46 and the compensation pitch calculator 48 can be implemented as a single controller. Then, the integrated controller may receive voltage error as input and provide compensation pitch value as output.

Also, the compensation real power calculator 46 and the compensation pitch calculator 48 can include any one of, or a combination of, a proportional controller, a proportional-derivative controller, a proportional-integral controller, and a proportional-integral-derivative controller, and can perform linear control.

Figure 4:
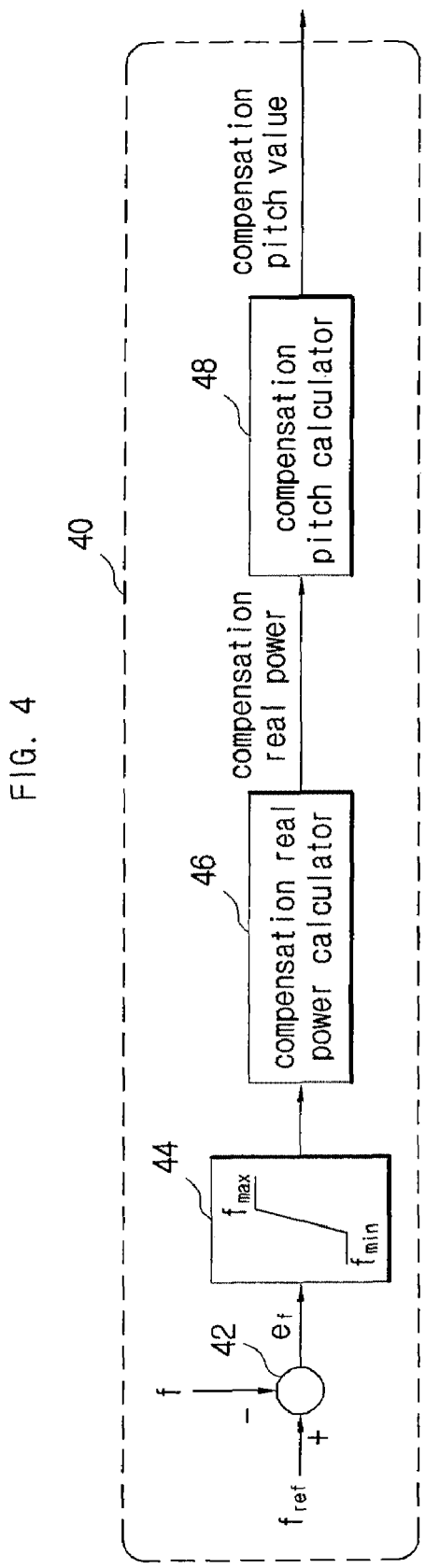
FIG. 4 is a diagram illustrating a compensation pitch calculating unit 40 according to another embodiment.

FIG. 4 is a diagram illustrating a compensation pitch calculating unit 40 according to another embodiment of the present invention.

Referring to FIG. 4, the compensation pitch calculating unit 40 may include a frequency comparing unit 42, which may compare a measurement frequency measured at the grid connection point with a predefined reference frequency for the grid connection point to calculate a frequency error, a frequency error limiting unit 44, which may set the limit of the frequency error, a compensation real power calculator 46, which may calculate the compensation real power value, and a compensation pitch calculator 48, which may calculate a compensation pitch value.

First, the frequency comparing unit 42 may compare the measurement frequency (f), measured at the grid connection point, with the reference frequency ($f_{ref}$) of the grid connection point to calculate a frequency error ($e_f$), which is the frequency difference.

Here, the reference frequency ($f_{ref}$) may be a frequency that allows a stable management of the grid frequency and a stable supply of electric power, and may be predefined by the administrator in correspondence with the measurement frequency (f).

Next, the frequency error limiting unit 44 may set the limit of the frequency error using a maximum frequency ($f_{max}$) and a minimum frequency ($f_{min}$) predefined by the user.

That is, among the frequency errors inputted, the frequency error limiting unit 44 may pass only tolerable frequency errors, which lie within a range defined by the maximum frequency ($f_{max}$) and minimum frequency ($f_{min}$).

For example, in FIG. 4, if the minimum frequency ($f_{min}$) is 0 Hz, and the maximum frequency ($f_{max}$) is 1 Hz, the configuration in FIG. 4 may not be activated when the frequency error ($e_f$) is 2 Hz, so that the compensation pitch value becomes 0 degree. When the frequency error ($e_f$) is 0.5 Hz, the tolerable frequency error becomes 0.5 Hz.

Here, some reasons for setting limits for the inputted frequency error include preventing the pitch value for the generator from being modified excessively such that the generator is halted and a large impact is incurred on the power grid, and preventing the pitch value from being modified too much at once.

Next, using the tolerable frequency error inputted through the frequency error limiting unit 44, the compensation real power calculator 46 may calculate the real power value that compensates for the frequency error.

Here, a reason for calculating the real power value is that voltage and real power are closely correlated, so that voltage may change in accordance with a change in real power.

That is, the compensation real power calculator 46 may calculate a compensation real power value corresponding to the tolerable frequency error that can be used to compensate for the frequency error.

For example, the compensation real power calculator 46 may calculate the compensation real power value by Equation 5 as follows:

$$F = \text{(proportional term)} + \int_0^t \text{(integral term)}\, dt \quad \text{[Equation 5]}$$

Here, F is assumed to be a proportional-integral controller. t represents time in units of seconds. If the proportional term is 1, the integral term is 5, the units are in Watt/Hz, and the tolerable frequency error, i.e. the input value, is 0.5 Hz, then the compensation real power value, i.e. the output value, becomes 0.55 Watts. That is, the equation may be computed as follows:

$$0.55 \, \text{Watt} = \left(1 + \int_0^{0.2} 5 \, dt\right) \times 0.5 \, \text{Hz}$$

Next, the compensation pitch calculator 48 may calculate the compensation pitch value corresponding to the compensation real power value inputted from the compensation real power calculator 46. That is, the compensation pitch calculator 48 may use an integrator to calculate the compensation pitch value that renders the final frequency error a value of zero.

For example, the compensation pitch calculator 48 may calculate the compensation pitch value by Equation 6 as follows:

$$F = (\text{proportional term}) + \int_0^t (\text{integral term}) \, dt \quad \text{[Equation 6]}$$

Here, F is assumed to be a proportional-integral controller. t represents time in units of seconds. If the proportional term is 1, the integral term is 5, the units are in degree/Watt, and the compensation real power, i.e. the input value, is 0.55 Watts, then the compensation pitch value, i.e. the output value, becomes 1.1 degrees. That is, the equation may be computed as follows:

$$1.1 \, \text{degree} = \left(1 + \int_0^{0.2} 5 \, dt\right) \times 0.55 \, \text{Watt}$$

Figure 5:
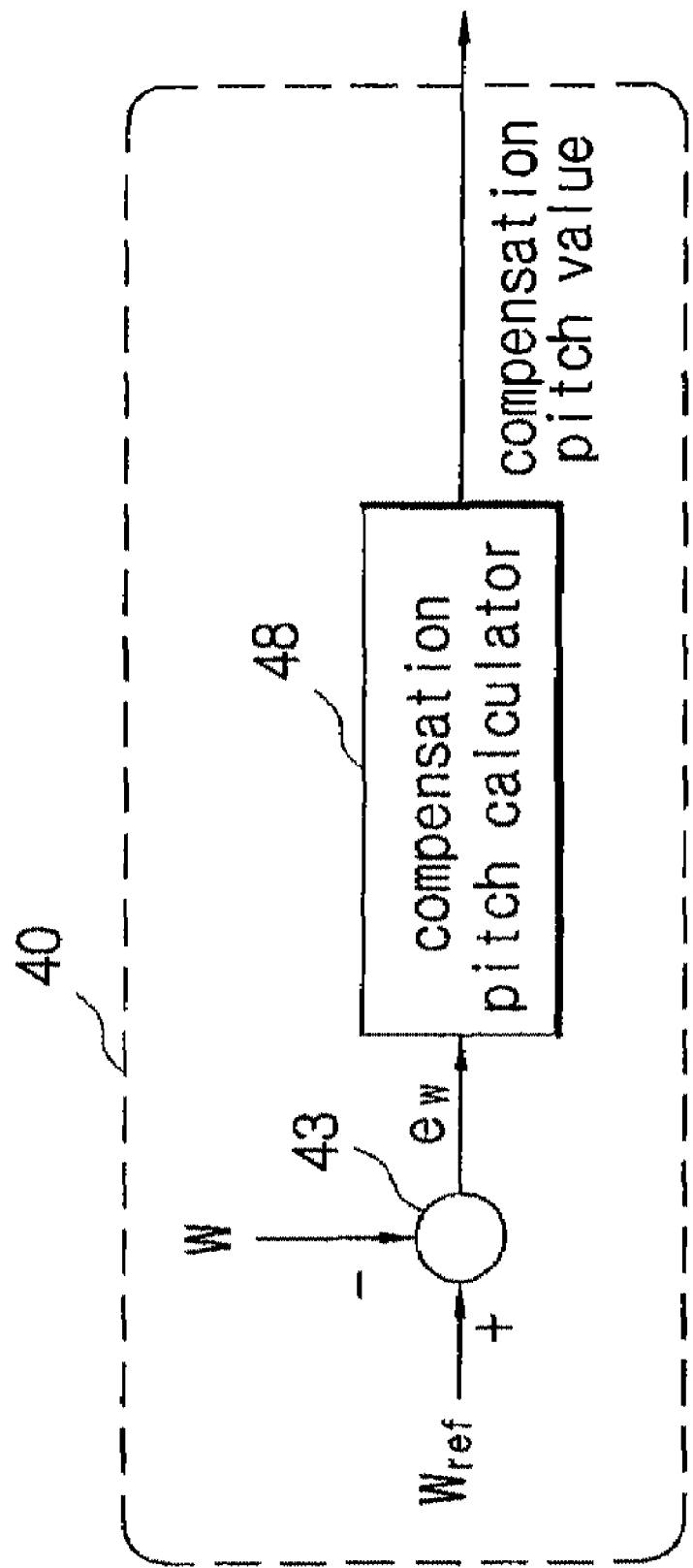
FIG. 5 is a diagram illustrating a compensation pitch calculating unit 40 according to another embodiment.

FIG. 5 is a diagram illustrating a compensation pitch calculating unit 40 according to another embodiment of the present invention.

Referring to FIG. 5, the compensation pitch calculating unit 40 may include a speed comparer 43, which may compare the measurement speed measured at the rotor of the generator 1 with a predefined reference speed of the generator's rotor to calculate a speed error, and a compensation pitch calculator 48, which may calculate a compensation pitch value.

First, the speed comparer 43 may compare the measurement speed (W), measured at the rotor of the direct-current generator, with the reference speed ($W_{ref}$) of the generator's rotor to calculate the speed error ($e_W$), which is the speed difference.

Here, the reference speed ($W_{ref}$) may be a speed for the rotor of the generator that allows a stable management of the grid and a stable supply of electric power, and may be predefined by the administrator in correspondence with the measurement speed (W).

Next, the compensation pitch calculator 48 may calculate the compensation pitch value corresponding to the speed error ($e_W$) inputted from the speed comparer 43. That is, the compensation pitch calculator 48 may use an integrator to calculate the compensation pitch value that renders the final speed error a value of zero.

For example, the compensation pitch calculator 48 may calculate the compensation pitch value by Equation 7 as follows:

$$F = (\text{proportional term}) + \int_0^t (\text{integral term}) \, dt \quad \text{[Equation 7]}$$

Here, F is assumed to be a proportional-integral controller. t represents time in units of seconds. If the proportional term is 1, the integral term is 5, the units are in degree/rpm, and the speed error, i.e. the input value, is 5 rpm, then the compensation pitch value, i.e. the output value, becomes 5 degrees. That is, the equation may be computed as follows:

$$5 \, \text{degree} = \left(1 + \int_0^{0.2} 5 \, dt\right) \times 5 \, \text{rpm}$$

Figure 6:
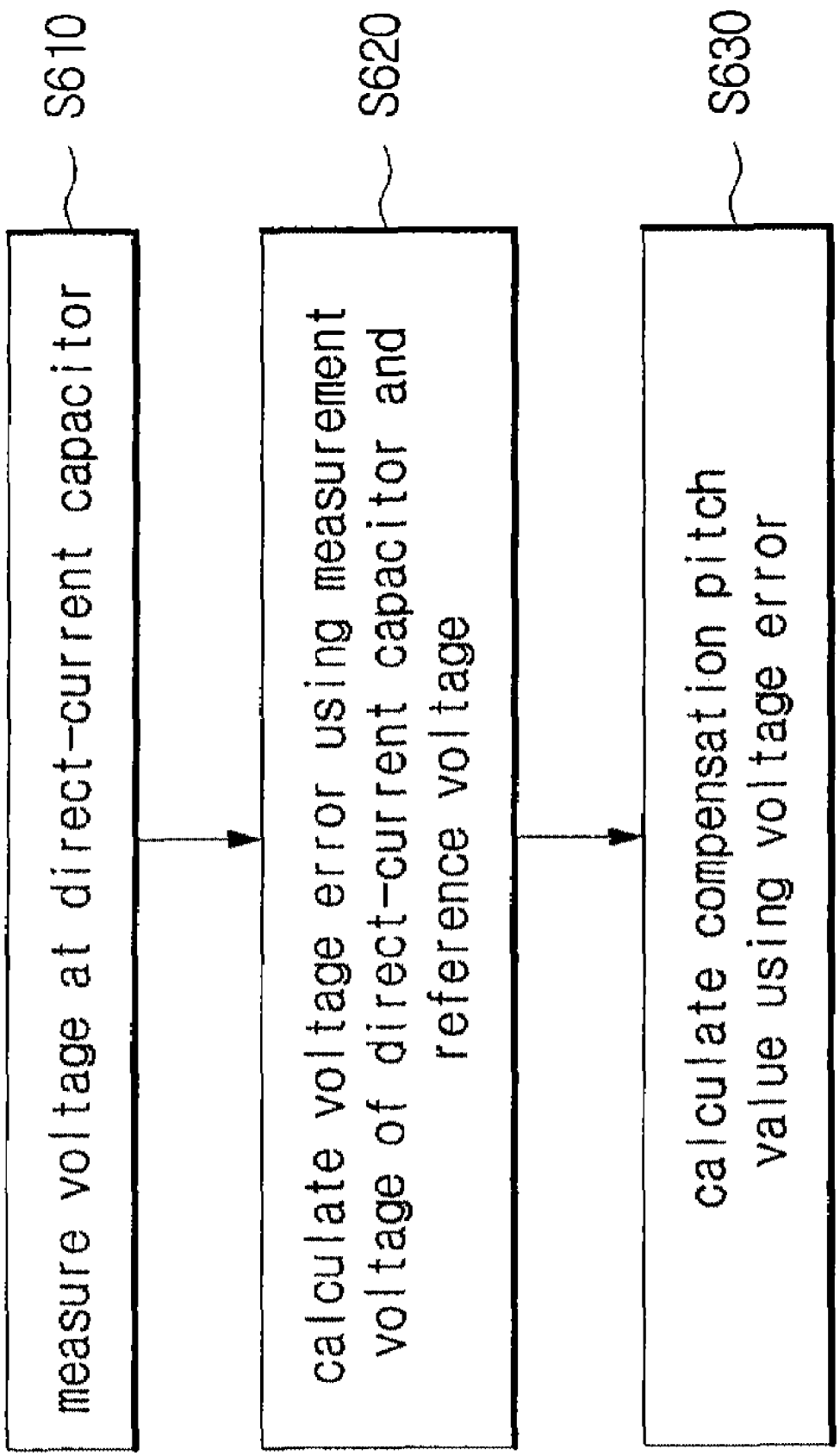
FIG. 6 is a flowchart illustrating a method of generating a compensation pitch value according to an embodiment.

FIG. 6 is a flowchart illustrating a method of generating a compensation pitch value according to an embodiment of the present invention. To be more specific, FIG. 6 is a flowchart illustrating a method of generating a compensation pitch value for performing a pitch control method according to an embodiment of the present invention.

The functions of the various elements described with reference to FIG. 3 can be processed within the compensation pitch calculating unit 40 according to an embodiment of the present embodiment. Thus, to allow a better understanding of the present invention, the following descriptions will be provided from the perspective of the compensation pitch calculating unit 40.

Referring to FIG. 6, the compensation pitch calculating unit 40 may measure the voltage at the direct-current capacitor 3 (S610). In another embodiment, the compensation pitch calculating unit 40 may measure the voltage at the grid connection point.

Then, the compensation pitch calculating unit 40 may calculate the voltage error using the measurement voltage of the direct-current capacitor 3 and the reference voltage (S620). The compensation pitch calculating unit 40 may also calculate the voltage error using the measurement voltage of the grid connection point and the reference voltage. Here, the reference voltage may be predefined by the user in correspondence with the measurement voltage.

Then, using the voltage error, the compensation pitch calculating unit 40 may calculate a compensation pitch value corresponding to the voltage error (S630). In another embodiment, the compensation pitch calculating unit 40 may calculate a compensation real power value corresponding to the voltage error, and using the compensation real power value, may calculate the compensation pitch value corresponding to the compensation real power value.

Figure 7:
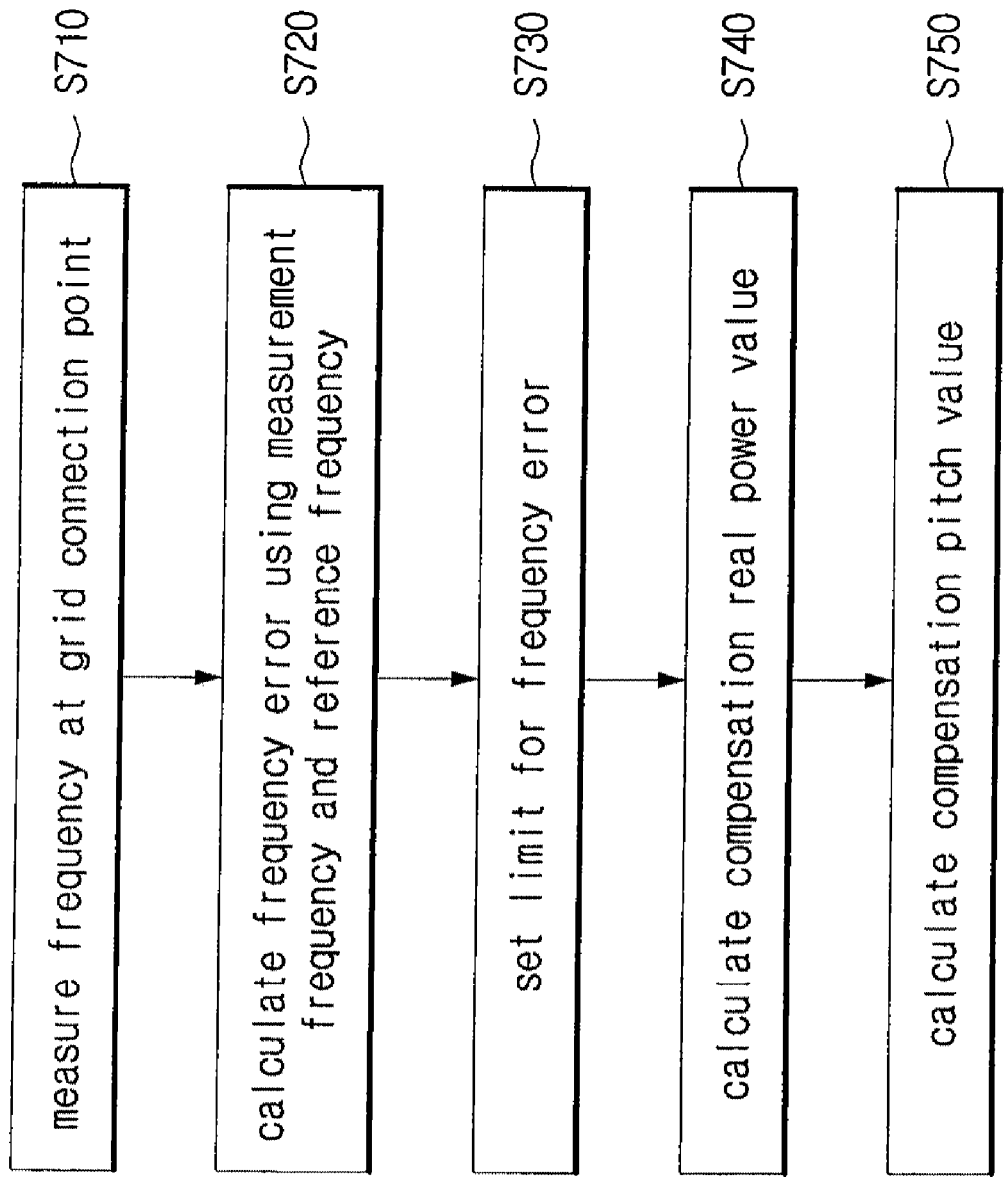
FIG. 7 is a flowchart illustrating a method of generating a compensation pitch value according to another embodiment.

FIG. 7 is a flowchart illustrating a method of generating a compensation pitch value according to another embodiment of the present invention.

The functions of the various elements described with reference to FIG. 4 can be processed within the compensation pitch calculating unit 40 according to another embodiment of the present embodiment. Thus, to allow a better understanding of the present invention, the following descriptions will be provided from the perspective of the compensation pitch calculating unit 40.

Referring to FIG. 7, the compensation pitch calculating unit 40 may measure the frequency at the grid connection point (S710).

Then, the compensation pitch calculating unit 40 may calculate the frequency error using the measurement frequency of the grid connection point and the reference frequency (S720). Here, the reference frequency may be predefined by the user in correspondence with the measurement frequency. The frequency error refers to the difference between the reference frequency and the measurement frequency.

Then, the compensation pitch calculating unit 40 may set tolerance limits for the frequency error (S730). Here, setting the tolerance limits may include passing only the tolerable frequency errors that are included in the range set by the maximum and minimum frequency errors, from among the frequency errors, using predefined maximum and minimum frequency values.

Then, the compensation pitch calculating unit 40 may calculate the compensation real power value corresponding to the tolerable frequency error having a set limit (S740).

Then, using the compensation pitch value, the compensation pitch calculating unit 40 may calculate the compensation pitch value corresponding to the compensation real power value (S750).

Figure 8:
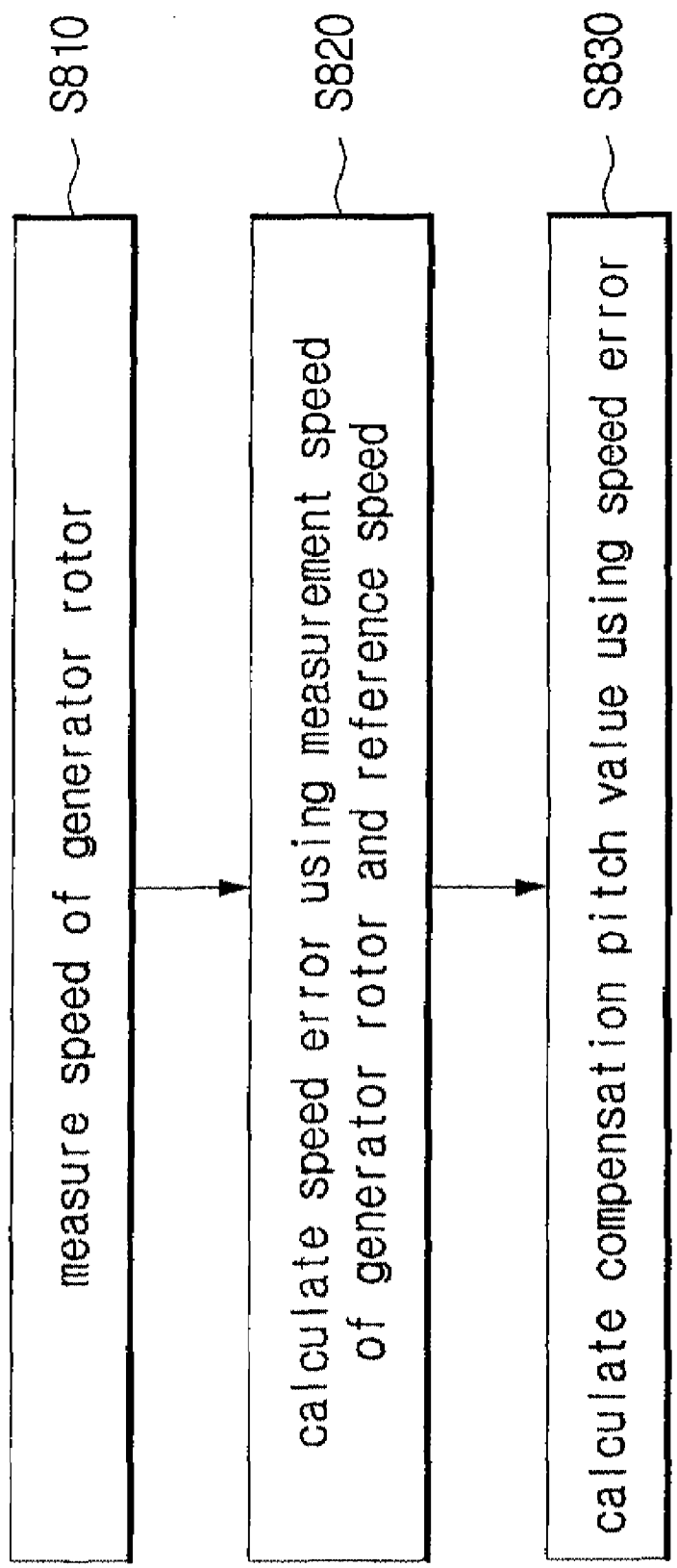
FIG. 8 is a flowchart illustrating a method of generating a compensation pitch value according to another embodiment.

FIG. 8 is a flowchart illustrating a method of generating a compensation pitch value according to another embodiment of the present invention.

The functions of the various elements described with reference to FIG. 5 can be processed within the compensation pitch calculating unit 40 according to another embodiment of the present embodiment. Thus, to allow a better understanding of the present invention, the following descriptions will be provided from the perspective of the compensation pitch calculating unit 40.

Referring to FIG. 8, the compensation pitch calculating unit 40 may measure the speed at the rotor of the generator (S810).

Then, the compensation pitch calculating unit 40 may calculate the speed error using the measurement speed of the generator rotor and the reference speed (S820). Here, the reference speed may be predefined by the user.

Then, using the speed error, the compensation pitch calculating unit 40 may calculate the compensation pitch value corresponding to the speed error (S830).

Figure 9:
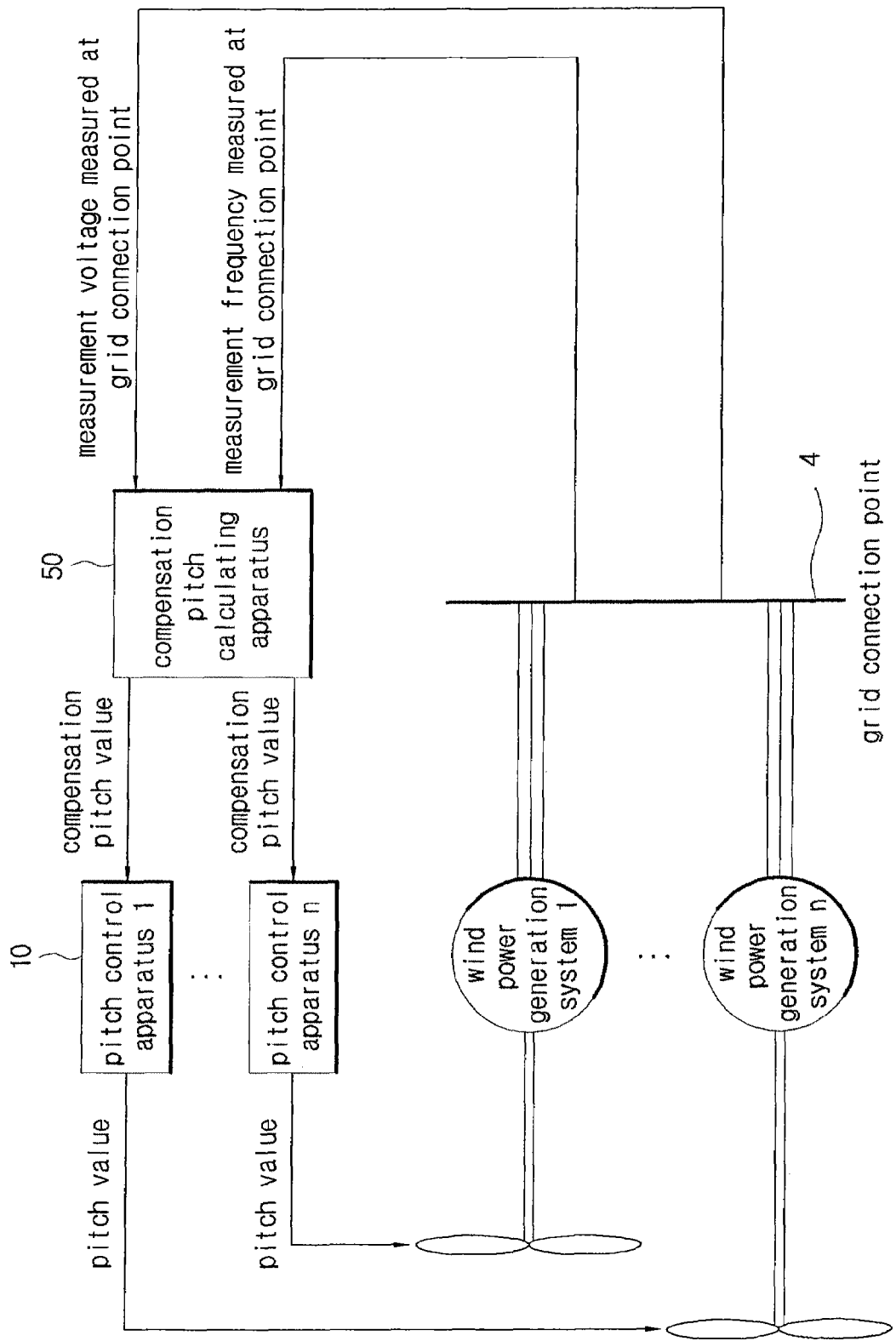
FIG. 9 is a drawing representing the relationship between pitch control apparatuses 10, a compensation pitch calculating apparatus 50, and wind power generation systems according to another embodiment.

FIG. 9 is a drawing representing the relationship between pitch control apparatuses 10, a compensation pitch calculating apparatus 50, and wind power generation systems according to another embodiment of the present invention. To be more specific, FIG. 9 illustrates the relationship between pitch control apparatuses 10, a compensation pitch calculating apparatus 50, and wind power generation systems when there is more than one wind power generation system.

Referring to FIG. 1, the multiple number of wind power generation systems may include a multiple number of pitch control apparatuses 10 and a compensation pitch calculating apparatus 50, which transfers a compensation pitch value to each of the pitch control apparatuses 10.

The compensation pitch calculating apparatus 50 can measure the frequency at the grid connection point 4 of the wind power generation systems, calculate the compensation pitch value in accordance with the change in measurement frequency, and transfer the compensation pitch value to the pitch control apparatuses 10, to thereby control the pitch values of the wind power generation systems. In the event of low voltage in the grid, the frequency at the grid connection point 4 can be induced above the rated frequency.

The compensation pitch calculating apparatus 50 according to another embodiment of the present invention can measure the voltage at the grid connection point 4 of the wind power generation systems, calculate the compensation pitch value in accordance with the change in measurement voltage, and thus control the pitch values of the wind power generation systems. In the event of low voltage in the grid, the voltage at the grid connection point 4 can be induced above the rated voltage.

That is, the compensation pitch calculating apparatus 50 can generate compensation pitch values using the error value at the grid connection point of the multiple wind power generation systems.

For the convenience of description and understanding of the present invention, the following will describe aspects of the invention under the assumption that the error value is the frequency error at the grid connection point 4. However, it is apparent that the present invention is not thus limited, and that the error value for the compensation pitch calculating apparatus 50 according to an aspect of the present invention can be any error value of the wind power generation systems that may be caused by low voltage in the grid. Here, the error value of the wind power generation system can be a voltage error or frequency error at the grid connection point, as described above.

Figure 10:
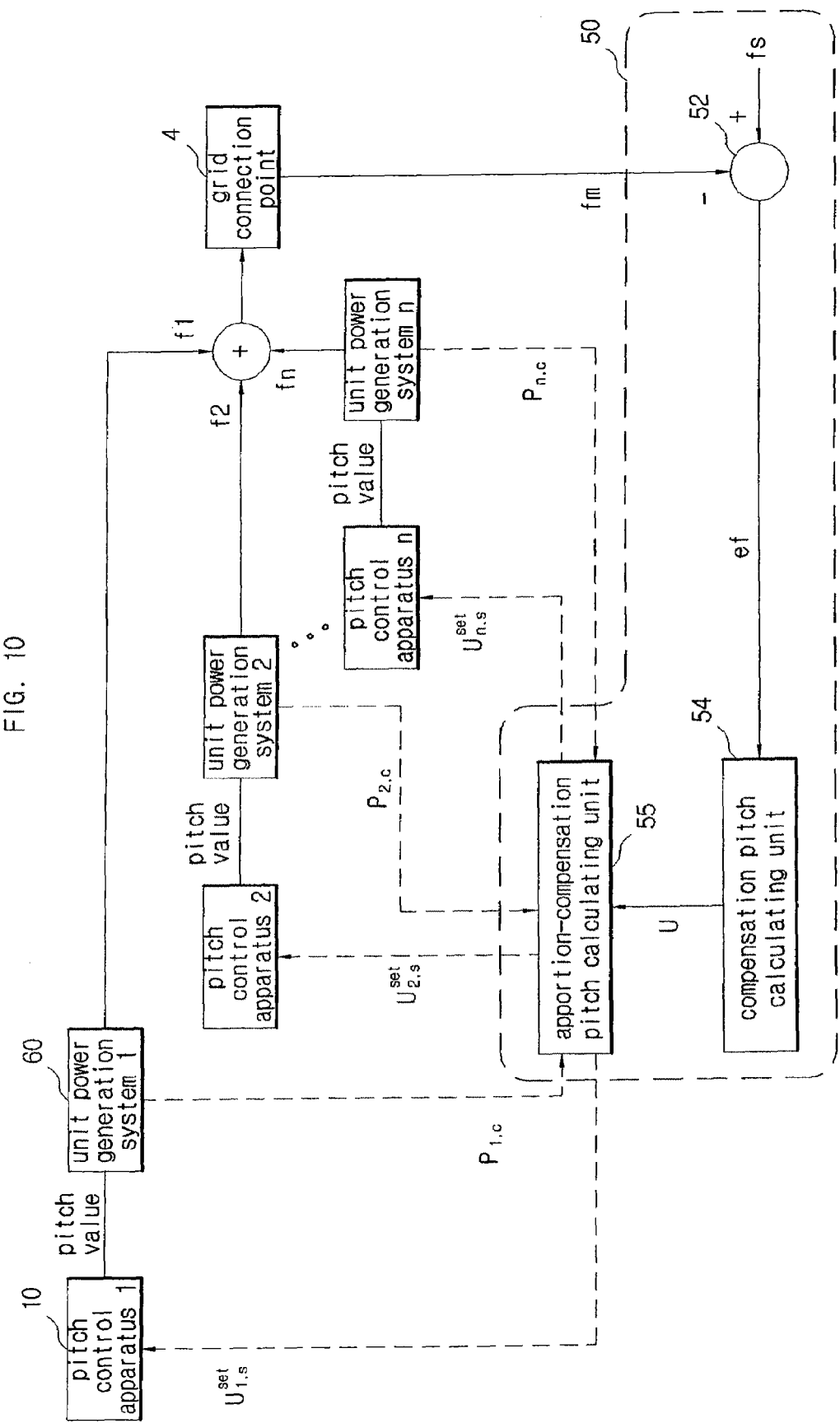
FIG. 10 is a diagram illustrating a wind power generation system according to another embodiment.

FIG. 10 is a diagram illustrating a wind power generation system according to another embodiment of the present invention.

Referring to FIG. 10, a wind power generation system according to an aspect of the present invention can include a multiple number of pitch control apparatuses 10, a grid connection point 4, to which a multiple number of unit power generation systems 60 may be connected, a compensation pitch calculating apparatus 50, which is connected to each of the pitch control apparatuses 10 and calculates the frequency error ($e_f$) at the grid connection point 4 and inputs an apportioned compensation pitch value to the pitch control apparatus 10 using the frequency error ($e_f$), and the unit power generation systems 60. To be more specific, the wind power generation system can be composed of an n number of (where n is a natural number) unit power generation systems 60 and pitch control apparatuses 10.

In the descriptions that follow, the compensation pitch calculating apparatus 50 according to an aspect of the present invention can advantageously be the compensation pitch calculating apparatus of a wind power generation system, but it is apparent to those skilled in the art that it may also be applied to other types of power generation systems that utilize pitch control apparatuses 10.

The compensation pitch calculating apparatus 50 can include a frequency comparing unit 52 for calculating the frequency error at the grid connection point 4, a compensation pitch calculating unit 54 for calculating the compensation pitch value corresponding to the frequency error, and an apportion-compensation pitch calculating unit 55 that calculates the apportion-compensation pitch values and inputs these values to the pitch control apparatuses 10.

The compensation pitch calculating apparatus 50 according to an aspect of the present invention will be described later in further detail with reference to FIG. 11 through FIG. 13.

A unit power generation system 60 can include a power generating apparatus (not shown) that is managed together with the pitch control apparatus 10. Here, the power generating apparatus can be a generator. Here, the generator can be a squirrel cage induction generator or a permanent magnet generator, and it is apparent to those skilled in the art that other generators may also be applied.

A pitch control apparatus 10 may be an apparatus that controls the pitch value so that the wind turbine may obtain a maximum output from the wind energy. A power generation system that includes pitch control apparatuses 10 according to an aspect of the present invention can advantageously be a wind power generation system, but it is apparent to those skilled in the art that the pitch control apparatuses 10 may be applied to other power generation systems that utilize natural forces.

Also, it is apparent to those skilled in the art that a pitch control system according to an aspect of the present invention can be implemented with a built-in compensation pitch calculating apparatus 50 or with the compensation pitch calculating apparatus 50 connected as an external apparatus to the pitch control apparatus 10.

The pitch control apparatus 10 according to an aspect of the present invention will be described later in further detail with reference to FIG. 11.

The grid connection point 4 may be the point at which the power generation systems access the power grid network (not shown) so that the electrical power may be supplied to the user. The frequency at the grid connection point 4 may be controlled using the compensation pitch value generated by the compensation pitch calculating apparatus 50 according to an aspect of the present invention.

Figure 11:
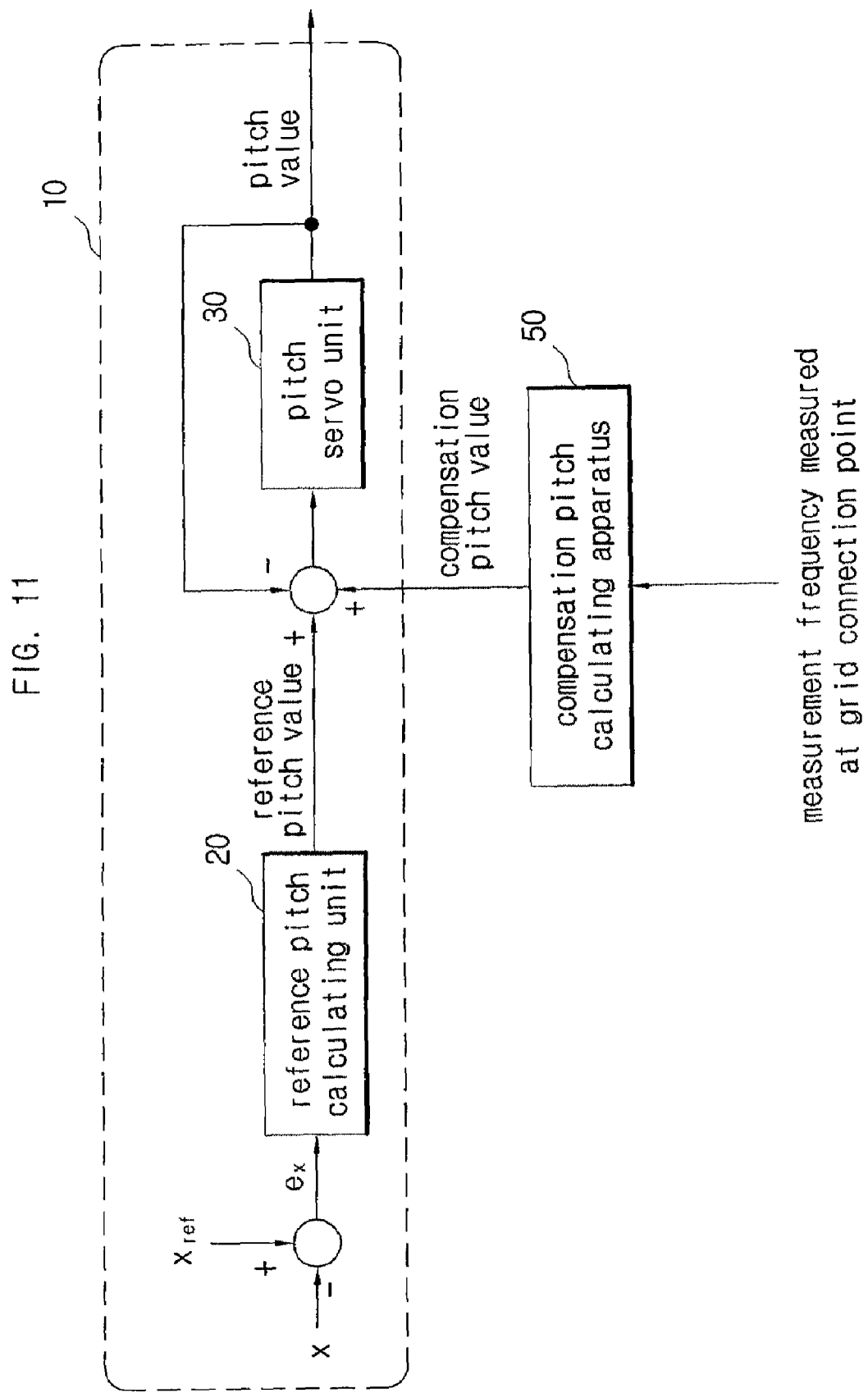
FIG. 11 is a diagram illustrating a pitch control system according to another embodiment.

FIG. 11 is a diagram illustrating a pitch control system according to another embodiment of the present invention. To be more specific, FIG. 11 is a diagram illustrating a pitch control system according to another embodiment of the present invention that includes a compensation pitch calculating apparatus 50 and a pitch control apparatus 10. Here, the pitch control system according to an aspect of the present invention can be composed of a multiple number of pitch control apparatuses 10 and a single compensation pitch calculating apparatus 50. That is, the compensation pitch calculating apparatus 50 according to another embodiment of the present invention may transfer a compensation pitch value to each of the pitch control apparatuses 10 that control the pitch values of a multiple number of unit power generation systems 60.

Referring to FIG. 11, the pitch control system can include a pitch control apparatus 10 and a compensation pitch calculating apparatus 50.

The pitch control apparatus 10 can include a reference pitch calculating unit 20 and a pitch servo unit 30, which calculates a pitch value using the reference pitch value generated at the reference pitch calculating unit 20.

The pitch control system can include the compensation pitch calculating apparatus 50 described above with reference to FIG. 10. Here, the compensation pitch calculating apparatus 50 can include controllers that output compensation pitch values, which correspond with the frequency error at the grid connection point 4, to the pitch servo unit 30.

The compensation pitch calculating apparatus 50 will be described later in further detail with reference to FIG. 12 and FIG. 13.

In the descriptions that follow, the components of the pitch control apparatus 10 will not be described again, as they have been described above with reference to FIG. 2.

Figure 12:
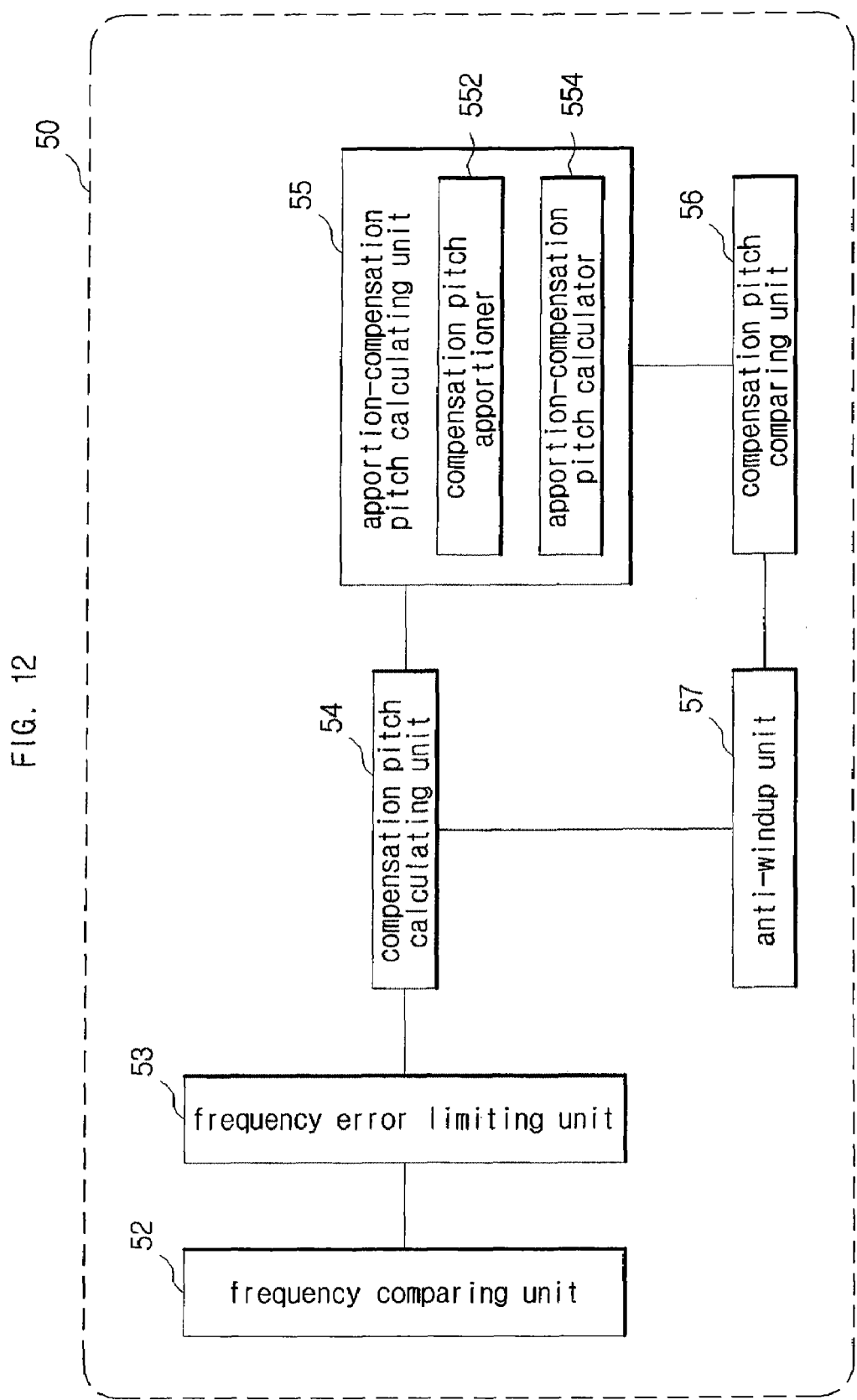
FIG. 12 is a block diagram illustrating a compensation pitch calculating apparatus 50 according to another embodiment.
Figure 13:
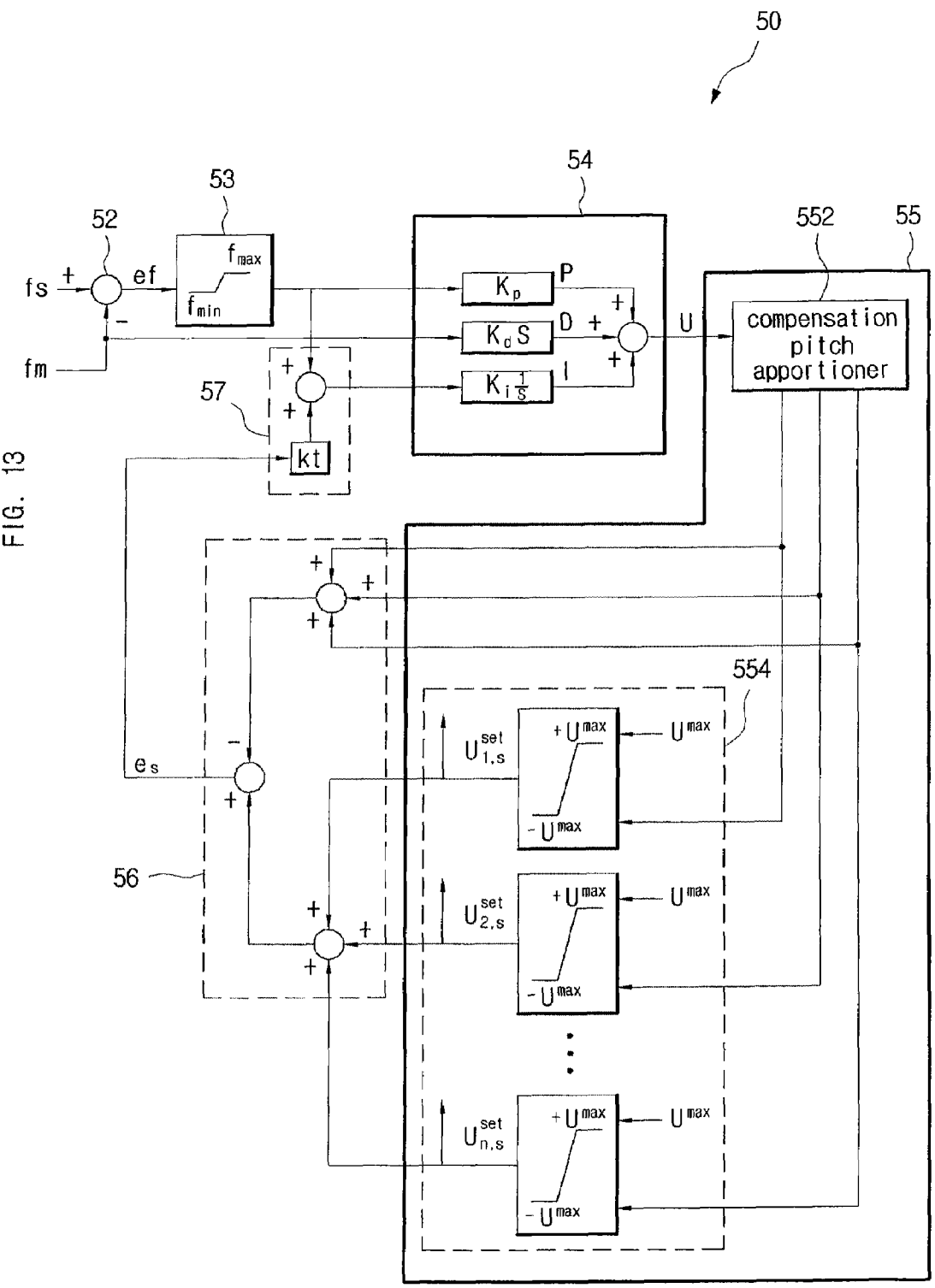
FIG. 13 is a diagram illustrating a compensation pitch calculating apparatus 50 according to another embodiment.

FIG. 12 is a block diagram illustrating a compensation pitch calculating apparatus 50 according to another embodiment of the present invention, and FIG. 13 is a diagram illustrating a compensation pitch calculating apparatus 50 according to another embodiment of the present invention.

Referring to FIG. 12 and FIG. 13, the compensation pitch calculating apparatus 50 can include a frequency comparing unit 52, a frequency error limiting unit 53, a compensation pitch calculating unit 54, an apportion-compensation pitch calculating unit 55, a compensation pitch comparing unit 56, and an anti-windup unit 57.

Based on the measurement frequency ($f_m$) measured at the grid connection point 4 and the reference frequency ($f_s$) of the grid connection point 4, the frequency comparing unit 52 may calculate the frequency error ($e_f$), which is the frequency difference. Here, the reference frequency ($f_s$) may be a frequency that allows a stable supply of electric power, and may be predefined by the administrator.

The frequency comparing unit 52 may vary according to the type of error value. For example, if the error value is a voltage error, a voltage comparing unit (not shown) may be employed.

Next, the frequency error limiting unit 53 may set the limits for the frequency error using the maximum frequency ($f_{max}$) and minimum frequency ($f_{min}$) predefined by the user.

That is, among the frequency errors inputted, the frequency error limiting unit 53 may pass only the tolerable frequency errors, which lie within a range defined by the maximum frequency ($f_{max}$) and minimum frequency ($f_{min}$).

For example, if the minimum frequency ($f_{min}$) is 0 Hz, and the maximum frequency ($f_{max}$) is 1 Hz, the frequency error limiting unit 53 may not pass the frequency error ($e_f$) when the frequency error ($e_f$) is 2 Hz. Since the compensation pitch calculating apparatus 50 is not activated, the compensation pitch value becomes 0 degree. When the frequency error ($e_f$) is 0.5 Hz, the tolerable frequency error becomes 0.5 Hz.

Reasons for setting limits for the inputted frequency error include preventing the pitch value for the generator from being modified excessively such that the generator is halted and a large impact is incurred on the power grid, as well as preventing the pitch value from being modified too much at once.

The frequency error limiting unit 53 may vary according to the type of error value. For example, if the error value is voltage error, a voltage error limiting unit (not shown) may be employed.

The compensation pitch calculating unit 54 may perform a linear control for the frequency error ($e_f$) to calculate the compensation pitch value (U) required for frequency control at the power connection point.

The apportion-compensation pitch calculating unit 55 may include a compensation pitch apportioner 552, which may apportion the compensation pitch value (U) calculated by the compensation pitch calculating unit 54 to an n number of values, and an apportion-compensation pitch calculator 554, which may compare each of the apportioned values of the compensation pitch value (U) with the pitch limit values ($U^{max}$) to calculate the apportion-compensation pitch values ($U^{set}j$,s).

The compensation pitch comparing unit 56 may calculate deviation signals ($e_s$), and the anti-windup unit 57 may prevent saturation in the compensation pitch calculating unit 54.

The compensation pitch calculating apparatus 50 using a frequency, according to an aspect of the present invention, will be described below in further detail with reference to FIG. 13.

First, the compensation pitch calculating unit 54 can be any one of a proportional-integral (PI) controller, a proportional-derivative (PD) controller, and a proportional-integral-derivative (PID) controller, which are controllers in which the output values are used as feedback for the control. As illustrated in FIG. 13, however, a proportional-integral-derivative (PID) controller, which provides both the benefits of a proportional controller, an integral (I) controller for improving steady-state responses, and a derivative controller for improving response speed, may be advantageously used.

Next, the anti-windup unit 57 may prevent saturation in the compensation pitch calculating unit 54, based on the deviation signals ($e_s$) fed back from the compensation pitch comparing unit 56 of the apportion-compensation pitch calculating unit 55.

The anti-windup unit 57 can prevent saturation, which may be caused by differences between the input end and output end during the operation of a controller that includes an integral (I) controller, such as a proportional-integral (PI) controller and a proportional-integral-derivative (PID) controller. Here, saturation may degrade transient response characteristics and steady-state response characteristics, to lower the performance of the compensation pitch calculating unit 54.

Thus, an aspect of the present invention can additionally include the anti-windup unit 57, to utilize an anti-windup function and prevent malfunctions in the compensation pitch calculating unit 54, which includes an integral controller.

The anti-windup unit 57 can use any one of a limit-setting method, in which the output of the compensation pitch calculating unit 54 is made not to exceed a set amount, an increment algorithm method, in which the control signal is calculated in increments for each sampling to control the compensation pitch calculating unit 54, and a tracking method, in which the difference between the output of the compensation pitch calculating unit 54 and the output of the apportion-compensation pitch calculator 554 is fed back to control the integrator, to prevent saturation in the compensation pitch calculating unit 54.

The anti-windup unit 57 will now be described below in further detail.

First, the anti-windup unit 57 may multiply a deviation signal ($e_s$) by a tracking time constant ($k_t$). Here, the deviation signal ($e_s$) may be calculated by comparing the sum of the compensation pitch value (U) apportioned by the compensation pitch apportioner 552 with the sum of the outputs of the apportion-compensation pitch calculator 554. The anti-windup unit 57 may add the deviation signal ($e_s$) multiplied by the tracking time constant ($k_t$) to the frequency error value, and input the result to the integral controller (I) of the compensation pitch calculating unit 54.

Thus, since the deviation signal ($e_s$) is 0 when there is no saturation in the apportion-compensation pitch calculating unit 55, the anti-windup unit 57 may not affect normal operation if there is no saturation in the apportion-compensation pitch calculating unit 55.

On the other hand, if the apportion-compensation pitch calculating unit 55 is saturated, a deviation signal ($e_s \neq 0$) may be generated, and the anti-windup unit 57 may reduce the input of the integral controller (I) of the compensation pitch calculating unit 54 by way of the feedback path, and thus prevent saturation.

The apportion-compensation pitch calculating unit 55 according to an aspect of the present invention can include a compensation pitch apportioner 552, an apportion-compensation pitch calculator 554, and a compensation pitch comparing unit 56.

First, the compensation pitch apportioner 552 may apportion the compensation pitch value (U), which is the output of the compensation pitch calculating unit 54, and supply the results to the apportion-compensation pitch calculator 554. Here, the apportion-compensation pitch calculator 554 may supply a control signal to each of the pitch servo units 30 equipped in the multiple pitch control apparatuses 10.

Next, the apportion-compensation pitch calculator 554 may calculate the apportion-compensation pitch value ($U^{set}_j$, s) corresponding to each pitch servo unit 30, by processing operations of comparing the pitch limit value ($U^{max}$) with the apportion-compensation pitch value (U) transferred from the compensation pitch apportioner 552.

The apportion-compensation pitch calculator 554 may provide the calculated compensation pitch values ($U^{set}_j$,s) as control signals to each of the multiple pitch servo units 30. Here, an apportion-compensation pitch value ($U^{set}_j$,s) may be a value obtained after apportioning the compensation pitch value (U) that compensates for the frequency error of the grid connection point 4. The apportion-compensation pitch value ($U^{set}_j$,s) may be supplied to a pitch control apparatus 10 and can be calculated using the following Equation 8.

$$U^{set}_{j,s} = \min\left\{U^{max}, \frac{P_{j,c}}{\sum_{n=1}^{j} P_{n,c}} U\right\}$$ [Equation 8]

Here, $U^{set}_j$,s represents a compensation pitch value as a control signal provided by the apportion-compensation pitch calculating unit 55 to the jth pitch control apparatus 10, $P_{j,c}$ represents the real power value of the jth unit power generation system 60 measured at the grid connection point 4 side.

$$\sum_{n=1}^{j} P_{n,c}$$

represents the sum of real power values from the first to the jth unit power generation systems 60 measured at the grid connection point 4 side, and $U^{max}$ represents the pitch limit value.

In the above Equation 8, min{a,b} represents a smaller value from among a and b, the subscripts is a natural number 1, 2, 3, . . . , n representing a number of a pitch control apparatus, and the superscript max represents the maximum value.

Next, the compensation pitch comparing unit 56 may compare the sum of the compensation pitch value (U) apportioned by the compensation pitch apportioner 552 with the sum of the compensation pitch values ($U^{set}_j$,s), which are the outputs of the apportion-compensation pitch calculator 554, to calculate the deviation signal ($e_s$) and provide feedback to the anti-windup unit 57.

A method of calculating the compensation pitch values in a compensation pitch calculating apparatus 50 having the structure disclosed above, according to an aspect of the present invention, will be described below in further detail with reference to FIG. 14.

Figure 14:
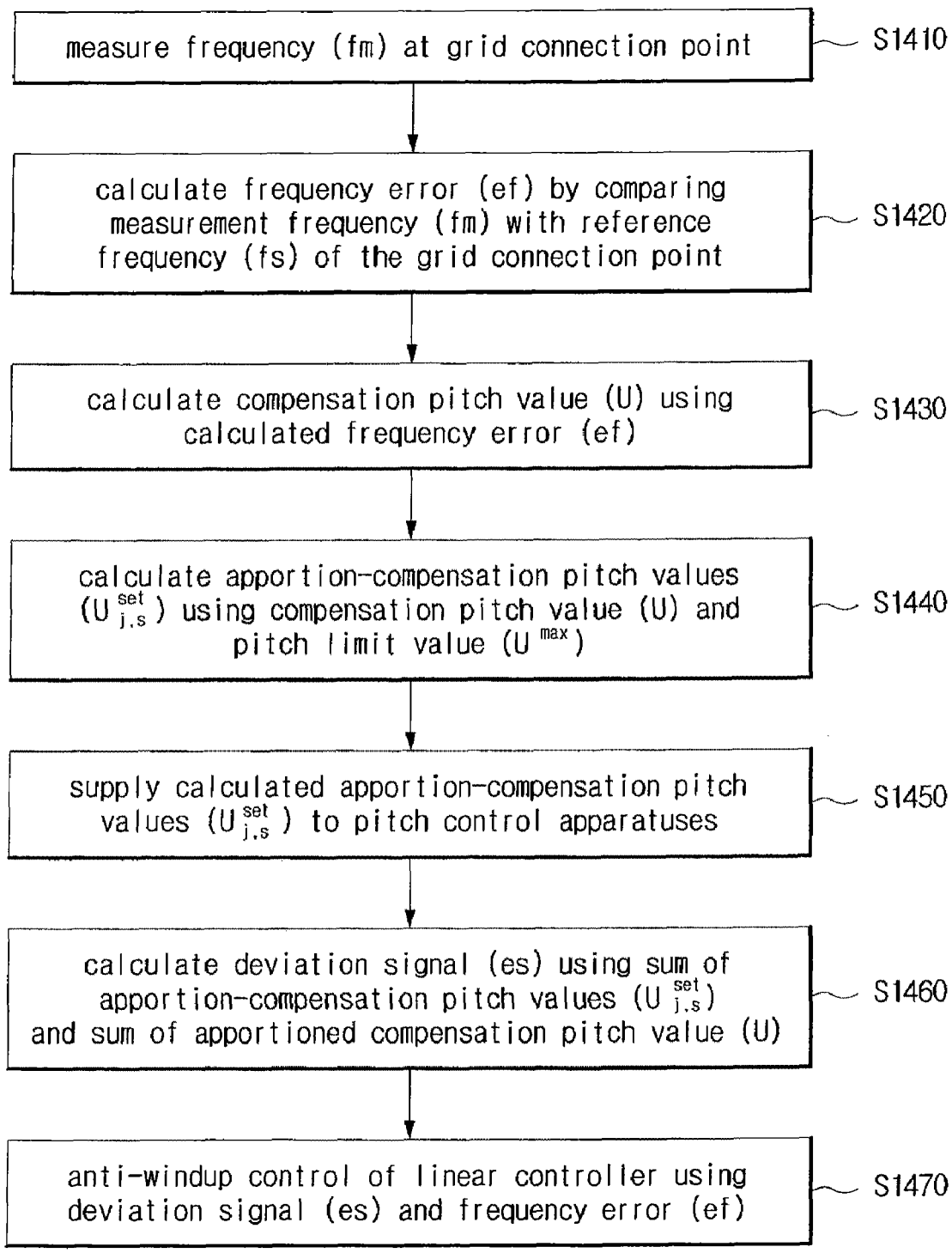
FIG. 14 is a flowchart illustrating a method of generating a compensation pitch value in a compensation pitch calculating apparatus 50 according to another embodiment.

FIG. 14 is a flowchart illustrating a method of generating a compensation pitch value in a compensation pitch calculating apparatus 50 according to another embodiment of the present invention.

In operation S1410, the frequency comparing unit 52 may measure the frequency of the grid connection point 4 to obtain a measurement frequency ($f_m$).

In operation S1420, the frequency comparing unit 52 may calculate the frequency error ($e_f$) based on the difference between the measured measurement frequency ($f_m$) and the reference frequency ($f_s$) for the grid connection point.

In operation S1430, the compensation pitch calculating unit 54 may receive the calculated frequency error ($e_f$) from the frequency comparing unit 52 and perform a linear controller with the controller included in the compensation pitch calculating unit 54, to calculate the compensation pitch value (U). That is, the compensation pitch calculating unit 54 may receive the frequency error ($e_f$) as input for the proportional controller (P) and perform a procedure of multiplying the frequency error ($e_f$) by the proportional gain ($k_p$). Also, the compensation pitch calculating unit 54 may receive the frequency error ($e_f$) as input for the integral controller (I) and perform a procedure of multiplying the frequency error ($e_f$) by the integral gain ($k_i$).

At the same time, the compensation pitch calculating unit 54 may receive the measurement frequency ($f_m$) measured at the grid connection point 4 as input for the derivative controller (D) and perform the procedures of obtaining the derivative of the measurement frequency ($f_m$) and multiplying the derivative gain ($k_d$).

Then, the compensation pitch calculating unit 54 may add the output values of each of the proportional controller (P), integral controller (I), and derivative controller (D) to calculate the compensation pitch value (U).

In operation S1440, the apportion-compensation pitch calculating unit 55 may calculate the apportion-compensation pitch values ($U^{set}j,s$) using the compensation pitch value (U) and the pitch limit value ($U^{max}$). The compensation pitch apportioner 552 may receive the compensation pitch value (U) calculated by the compensation pitch calculating unit 54 as input and apportion it to an n number of values (where n is a natural number). The apportion-compensation pitch calculator 554 may receive the apportioned values of the compensation pitch value (U) and supply the compensation pitch value as control signals to the multiple pitch control apparatuses 10. Here, the apportion-compensation pitch calculator 554 may perform the calculation represented by the above Equation 8, using the pitch limit value ($U^{max}$) and the apportioned compensation pitch value apportioned by and transferred from the compensation pitch apportioner 552, and calculate the apportion-compensation pitch value ($U^{set}j,s$) corresponding to each of the multiple pitch servo units 30.

In operation S1450, the apportion-compensation pitch calculator 554 may supply the calculated apportion-compensation pitch values ($U^{set}j,s$) to the pitch control apparatuses 10, and thus control the pitch control apparatuses 10. By controlling the pitch control apparatuses 10, the compensation pitch calculating apparatus 50 makes it possible to stably and easily control the operation of wind power generation systems according to an aspect of the present invention.

Then, in operation S1460, the compensation pitch comparing unit 56 may calculate the deviation signal ($e_s$) based on the difference between the sum of the apportion-compensation pitch values ($U^{set}j,s$) and the sum of the compensation pitch value (U) apportioned by the compensation pitch apportioner 552.

Then, in operation S1470, the anti-windup unit 57 may add a value obtained by multiplying the deviation signal ($e_s$) by the tracking time constant ($k_t$) to the frequency error ($e_f$) and input the result to the integral controller (I) of the compensation pitch calculating unit 54.

Here, the anti-windup unit 57 can reduce the input of the integral controller (I) by way of the feedback path, and thus prevent saturation in the compensation pitch calculating unit 54.

Thus, since the deviation signal ($e_s$) is 0 when there is no saturation in the apportion-compensation pitch calculating unit 55, the anti-windup unit 57 may not affect normal operation if there is no saturation in the apportion-compensation pitch calculating unit 55.

On the other hand, if the apportion-compensation pitch calculating unit 55 is saturated, so that a deviation signal ($e_s \neq 0$) is generated, the anti-windup unit 57 may reduce the input of the integral controller (I) by way of the feedback path through the tracking time constant of the anti-windup unit 57, and thus prevent saturation.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

We claim:

1. A pitch control apparatus for controlling a pitch value in a wind power generation system, the pitch control apparatus comprising:
   a generator comparing unit configured to calculate an error signal based on a difference between a generator measurement signal and a generator reference signal, the generator measurement signal corresponding with an operation of the power generation system;
   a reference pitch calculating unit configured to calculate a reference pitch value using the error signal;
   a compensation pitch calculating unit configured to calculate a compensation pitch value using an error value from the wind power generation system; and
   a pitch calculating unit configured to calculate a pitch value using the reference pitch value and the compensation pitch value,
   wherein the error value is any one of a voltage error value from a direct-current capacitor included in a power converter unit of the wind power generation system, a voltage error value from a grid connection point of the wind power generation system, a speed error value from a rotor of the wind power generation system, and a frequency error value from a grid connection point of the wind power generation system.

2. The pitch control apparatus of claim 1, wherein the generator measurement signal is a measurement signal relating to a rotation speed of a generator drive shaft or to a generator output, and the generator reference signal is a reference signal predefined in correspondence with the generator measurement signal.

3. The pitch control apparatus of claim 1, wherein the voltage error value is calculated based on a difference between a voltage measured at a direct-current capacitor included in a power converter unit of the wind power generation system and a reference voltage predefined in correspondence with the measured voltage, or is calculated based on a difference between a voltage measured at a grid connection point of the wind power generation system and a reference voltage predefined in correspondence with the measured voltage.

4. The pitch control apparatus of claim 1, wherein the frequency error value is calculated based on a difference between a measurement frequency measured at a grid connection point of the wind power generation system and a reference frequency predefined in correspondence with the measurement frequency.

5. The pitch control apparatus of claim 1, wherein the speed error value is calculated based on a difference between a measurement speed measured at a rotor of the wind power generation system and a reference speed predefined in correspondence with the measurement speed.

6. The pitch control apparatus of claim 1, wherein the compensation pitch calculating unit comprises:
- a compensation real power calculator configured to calculate a compensation real power value by using the voltage error value; and
- a compensation pitch calculator configured to calculate a compensation pitch value by using the compensation real power value.

7. The pitch control apparatus of claim 1, wherein the compensation pitch calculating unit comprises:
- a compensation real power calculator configured to calculate a compensation real power value by using the frequency error value; and
- a compensation pitch calculator configured to calculate a compensation pitch value by using the compensation real power value.

8. The pitch control apparatus of claim 1, wherein the compensation pitch calculating unit comprises:
- a compensation real power calculator configured to calculate a compensation real power value by using the speed error value; and
- a compensation pitch calculator configured to calculate a compensation pitch value by using the compensation real power value.

9. The pitch control apparatus of claim 6, wherein the compensation pitch calculating unit further comprises:
- a comparer configured to calculate the voltage error value; and
- an error limiter configured to modify the voltage error value to a tolerable voltage error value within a predefined voltage range, if the voltage error value is outside the predefined voltage range.

10. The pitch control apparatus of claim 7, wherein the compensation pitch calculating unit further comprises:
- a comparer configured to calculate the frequency error value; and
- an error limiter configured to modify the frequency error value to a tolerable frequency error value within a predefined frequency range, if the frequency error value is outside the predefined frequency range.

11. The pitch control apparatus of claim 8, wherein the compensation pitch calculating unit further comprises:
- a comparer configured to calculate the speed error value; and
- an error limiter configured to modify the speed error value to a tolerable speed error value within a predefined speed range, if the speed error value is outside the predefined speed range.

12. A pitch control system for controlling pitch values in a plurality of wind power generation systems, the pitch control system comprising:
- a plurality of pitch control apparatuses; and
- a compensation pitch calculating apparatus configured to calculate an apportion-compensation pitch value by using a voltage error value or a frequency error value calculated at a grid connection point where the plurality of wind power generation systems are connected,
- wherein the pitch control apparatus comprises:
- a generator comparing unit configured to calculate an error signal based on a difference between a generator measurement signal and a generator reference signal, the generator measurement signal corresponding with an operation of the power generation system;
- a reference pitch calculating unit configured to calculate a reference pitch value by using the error signal; and
- a pitch calculating unit configured to calculate a pitch value by using the reference pitch value and the apportion-compensation pitch value calculated by the compensation pitch calculating apparatus.

13. The pitch control system of claim 12, wherein the generator measurement signal is a measurement signal relating to a rotation speed of a generator drive shaft or to a generator output, and the generator reference signal is a reference signal predefined in correspondence with the generator measurement signal.

14. The pitch control system of claim 12, wherein the voltage error value is calculated based on a difference between a voltage measured at a grid connection point of the wind power generation system and a reference voltage predefined in correspondence with the measured voltage.

15. The pitch control system of claim 12, wherein the frequency error value is calculated based on a difference between a measurement frequency measured at a grid connection point of the wind power generation system and a reference frequency predefined in correspondence with the measurement frequency.

16. The pitch control system of claim 12, wherein the compensation pitch calculating apparatus comprises:
- a compensation pitch calculating unit configured to calculate a compensation pitch value by using the voltage error value or the frequency error value; and
- an apportion-compensation pitch calculating unit configured to calculate a plurality of apportion-compensation pitch values for applying to the pitch control apparatuses by using the compensation pitch value and a predefined pitch limit value.

17. The pitch control system of claim 16, wherein the apportion-compensation pitch calculating unit comprises:
- a compensation pitch apportioner configured to calculate a plurality of first apportion-compensation pitch values by apportioning the compensation pitch value; and
- an apportion-compensation pitch calculator configured to calculate a plurality of second apportion-compensation pitch values for applying to the pitch control apparatuses by using the plurality of first apportion-compensation pitch values and a predefined pitch limit value.

18. The pitch control system of claim 17, wherein the apportion-compensation pitch calculating unit passes the first apportion-compensation pitch values included within the pitch limit values to calculate the second apportion-compensation pitch values.

19. The pitch control system of claim 16, wherein the compensation pitch calculating apparatus further comprises:
- a comparing unit configured to calculate the voltage error value or the frequency error value; and
- an error limiting unit configured to modify the voltage error value or the frequency error value to a tolerable voltage error value within a predefined voltage range or a tolerable frequency error value within a predefined frequency range, respectively, if the voltage error value or frequency error value is outside the predefined voltage range or predetermined frequency range, respectively.

20. The pitch control system of claim 16, wherein the compensation pitch calculating apparatus further comprises:
- a compensation pitch comparing unit configured to calculate a deviation signal by using a sum of first apportion-compensation pitch values and a sum of second apportion-compensation pitch values; and
- an anti-windup unit configured to prevent windup in the compensation pitch calculating unit by using the deviation signal and the voltage error value or the frequency error value.

21. The pitch control system of claim 20, wherein the anti-windup unit inputs to the compensation pitch calculating unit a sum of the deviation signal, multiplied by a tracking time constant ($k_t$), and the voltage error value or the frequency error value.

22. The pitch control system of claim 17, comprising a j number of wind power generation systems, j being a natural number, wherein a j number of pitch control apparatuses are connected to the wind power generation systems respectively, and the second apportion-compensation pitch values are calculated according to the following equation:

$$U^{set}_{j,s} = \min\left\{U^{max}, \frac{P_{j,c}}{\sum_{n=1}^{j} P_{n,c}} U\right\}$$

wherein $U^{set}_{j,s}$ is an apportion-compensation pitch value as a control signal provided to a jth pitch control apparatus by an apportion-compensation pitch calculating unit of a compensation pitch calculating apparatus, $P_{j,c}$ is a real power value of a jth unit wind power generation system, $$\sum_{n=1}^{j} P_{n,c}$$

is a sum of real power values from a first to the jth unit wind power generation systems, and $U^{max}$ is a pitch limit value, and wherein min{a,b} represents a smaller value between a and b, a subscript j is a natural number 1, 2, 3, . . . , n representing a number of a pitch control apparatus, and a superscript max represents a maximum value.

* * * * *